United States Patent Office 3,814,732
Patented June 4, 1974

3,814,732
MODIFIED SOLID SUPPORTS FOR SOLID
PHASE SYNTHESIS
Su-Sun Wang, Bloomfield, N.J., assignor to
Hoffmann-La Roche Inc., Nutley, N.J.
No Drawing. Filed Oct. 21, 1971, Ser. No. 191,472
Int. Cl. C08f 27/00, 27/08; C08g 20/08
U.S. Cl. 260—47 UP                          4 Claims

ABSTRACT OF THE DISCLOSURE

Solid support materials used in the solid phase synthesis of complex organic molecules may be modified by introduction of a p-oxy-benzyl alcohol or a p-oxy-benzyl-oxycarbonylhydrazide linking group to produce modified supports useful in solid phase preparation of protected product free acids and protected product hydrazides respectively. The resulting protected products are particularly useful in the fragment condensation approach to the synthesis of large, complex organic molecules.

BACKGROUND OF THE INVENTION

The use of solid phase synthesis techniques in the preparation of peptides is now well established and documented. See for example, R. B. Merrifield, Adv. Enzymol., 32 221 (1969). This technique has also been successfully applied to the synthesis of oligonucleotides, oligosaccharides and other complex organic molecules. However, synthetic materials completely identical to natural products, i.e., large polypeptides, have not yet been obtained. One reason for this problem arises from the enormous effort required for the synthesis of such giant molecules coupled with the fact that the solid phase technique does not allow the operator to isolate, purify and characterize the synthetic intermediates resulting in the accumulation of impurities structurally so similar to the desired compound that an effective purification of the final product proves to be exceedingly hard to achieve at the terminal stage.

In order to overcome this problem it has been suggested in the art to prepare modified support material containing functional groups that could be useful for solid phase synthesis of protected fragments, i.e., protected peptides, which could be isolated, purified and then coupled to other peptide chain fragments by fragment condensation methods to yield the desired complex molecules. In this manner it would be possible to combine the best features of conventional and solid phase peptide syntheses. Examples of modified supports suggested by the art include the following functional group modified Merrifield type resins (crosslinked polystyrene): bromoacyl resin, benzhydryl resin, 4-methylthiophenyl resin, 4-hydrazinobenzoyl resin and t-alkylalcohol resin. While these various types of modified resins are useful for the preparation of specific kinds of protected peptide fragments, none of them, because of the conditions required for cleavage of the fragment from the resin have exhibited an ability to be used in the general synthesis of different types of protected peptide fragments.

The use of a t-alkyloxycarbonyl hydrazide modified resin for the solid phase synthesis of peptide hydrazides is disclosed in the paper by Wang and Merrifield, J.A.C.S. 91 6488 (1969). This material requires the use of hydrogen fluoride during its preparation and thus is not amenable to facile large scale preparation since plastic equipment must be employed.

BRIEF DESCRIPTION OF THE INVENTION

The present invention relates to modified solid support materials which are of general usefulness in the solid phase synthesis of complex organic molecules, particularly protected polypeptides. The modification of the solid supports involves introduction of a p-oxy-benzyl alcohol or p-oxy-benzoyloxycarbonylhydrazide group onto the support material by reaction with the conventional terminal reactive sites on such supports. Stepwise addition of the protected components free acids of the desired fragment of the complex organic molecule can then be accomplished to produce a protected fragment chain linked to the solid support via classical techniques of solid phase synthesis. The protected fragment chain can then be cleaved from the support under mild acidic hydrolysis condiitons. These conditions are sufficiently mild to retain side chain protecting groups in the final product fragment. Furthermore, since no oxidation, thiolysis or hydrazinolysis steps are involved in the cleavage procedure the present invention is quite versatile and of general applicability.

The solid support materials useful in the practice of the present invention can be any of the materials conventionally employed in solid phase synthesis. These materials are described in great detail in the Merrifield review article cited above. A preferred support material is a polymeric hydrocarbon resin containing reactive group sites thereon such as for example a chloromethylated copolystyrene resin cross-linked in the range of from about 0.5 to 5% preferably between about 1 to 2% with divinylbenzene. This resin may be utilized in its normal form as obtained from commercial sources or alternatively in the form of a coating on a fluid impervious, shaped core material such as glass beads as described in U.S. Patent Application Ser. No. 100,368, filed Dec. 21, 1970, title: Solid-Phase Synthesis Support, inventors: C. Horvath and S. R. Lipsky.

The p-oxybenzyl alcohol modified support materials of the present invention may be prepared directly from the corresponding support materials having conventional reactive sites thereon by treating such support materials with 4-hydroxybenzyl alcohol in the presence of an alkali metal alkoxide, such as for example, sodium methoxide. This reaction is conveniently conducted in a polar organic non-protic solvent such as, for example, N,N-dimethylacetamide, dimethylformamide and the like. While temperature is not narrowly critical, it is desirable to utilize a temperature in the range of from about 50 to 100° C., most preferably in the range of from about 75 to 85° C., for a period of from 10 to 50 hours in the conduct of this reaction. It is also desirable that the reaction be conducted under an inert atmosphere such as argon, nitrogen, krypton and the like.

Alternatively, the p-oxybenzyl alcohol modified support materials may be prepared by a two-step procedure. In the first step the reactive sites on the support material are reacted with a $C_1$-$C_7$ lower alkyl 4-hydroxy benzoate such as methyl 4-hydroxybenzoate to produce a corresponding $C_1$-$C_7$ lower alkyl p-oxybenzoate modified support material. The conditions employed in this step are generally the same as those described above for the preparation of the p-oxybenzyl alcohol modified support material.

In the second step the ester function is reduced in a manner known per se with a chemical reducing agent to the desired p-oxybenzyl alcohol group. Suitable chemical reducing agents for this purpose include the complex metal hydrides, most preferably lithium aluminum hydride. The reaction is conveniently conducted in a suitable organic solvent, preferably an ethereal solvent such as ethyl ether and the like. A temperature in the range of from about 0 to 35° C., preferably in the range between about 20 to 30° C. may be employed for this reaction step.

The p-oxy-benzyloxycarbonylhydrazide modified support materials, which represent a further embodiment of the present invention, may be prepared from the corresponding p-oxy-benzyl alcohol modified support whose preparation has been described above. This transformation can be accomplished by reacting the p-oxybenzyl alcohol modified support with an arylhaloformate such as, for example, phenylchloroformate, p-nitrophenylchloroformate and the like, followed by hydrazinolysis of the product arylcarbonate support.

The reaction with the arylhaloformate may be conducted in an inert organic solvent, preferably a halogenated hydrocarbon such as, for example, methylene chloride, chloroform, carbon tetrachloride, and the like, at a temperature in the range of from about $-10$ to $10°$ C., most preferably in the range of from about 0 to $5°$ C. It is desirable to conduct this reaction in the presence of an added organic base such as a nitrogen compound, i.e., pyridine, 3-picoline, 4-picoline, quinoline, pyrrolidine and the like.

The hydrazinolysis is carried out in an inert polar organic solvent such as dimethylformamide, dimethylacetamide, dioxane or tetrahydrofuran at a temperature in the range between about 0 to $50°$ C., most preferably in the range of from about 20 to $30°$ C. Anhydrous hydrazine is the reagent of choice in this reaction.

In preferred embodiments of this invention the support material used is a chloromethylated copolystyrene-divinylbenzene resin which when modified in accordance with the present invention provides a support which is particularly useful in the solid phase synthesis of protected peptide free acids and protected peptide hydrazides. In these embodiments the very acid labile 2-(p-biphenyl)isopropyloxycarbonyl (Bpoc) function is employed for α-amino protection. Coupling of the first amino acid group to the modified resins of this invention may be accomplished utilizing techniques known in the art. A particularly preferred procedure involves use of a carbodiimide coupling agent such as N,N'-dicyclohexylcarbodiimide (DCC) in the presence of an organic amine catalyst such as pyridine or the use of a protected amino acid active ester such as the p-nitrophenyl ester, hydroxysuccinimide ester, pentachlorophenyl ester, trichlorophenyl ester, etc., in the presence of a catalyst such as imidazole, triazole and the like. Generally, from about 0.3 to 0.6 mmoles of Bpoc-amino per gram of support can be incorporated by this procedure.

To eliminate the excess unreacted free hydroxyl groups on the resin after coupling of the initial protected amino acid, the bonded resin is treated with an acylating agent, preferably an acyl halide, most preferably an acyl chloride in the presence of an equivalent amount of an organic amine base such as pyridine or a substituted pyridine, e.g., p-dimethylaminopyridine. As used herein the term "acyl" is meant to include the radical produced by removal of the hydroxyl moiety of a carboxyl group in a $C_1-C_{12}$ alkanoic acid or a monocyclic aryl carboxylic acid. Suitable acylating agents for use herein include benzoyl chloride and acetyl chloride. Benzoyl chloride is the preferred acylating agent. Acylation may be readily carried out utilizing a temperature in the range of from about $-10$ to $30°$ C., preferably in the range of from about 0 to $5°$ C.

No significant racemization is observed to take place during esterification of Bpoc-aminoacid to the modified resins of this invention. For example, Bpoc-L-phenylalanine (Bpoc-L-Phe) was coupled to a p-oxy-benzyl alcohol copolystyrene-1% divinylbenzene resin using DCC. The resulting material had the following structure Bpoc-Phe-$OCH_2$-$C_6H_4$-$OCH_2$-$C_6H_4$-Resin). The product is then deblocked with 0.5% trifluoroacetic acid (TFA), neutralized and then coupled with Boc-L-glutamic acid-γ-t-butyl ester by DCC to form (Boc-Glu-$Bu^t$)-Phe-$OCH_2$-$C_6H_4$-$OCH_2C_6H_4$-Resin. Cleavage with 50% TFA in methylene chloride gives L-Glu-L-Phe essentially free from L-Glu-D-Phe ($<0.1\%$). In another experiment, Bpoc-Leu-$OCH_2C_6H_4$-$OCH_2C_6H_4$-Resin is treated with 50% TFA and the liberated Leu sample reacted with L-leucine N-carboxy anhydride to form L-Leu-L-Leu. In this case also very little contamination ($<0.1\%$) of L-Leu-D-Leu is found.

The α-amino protecting group as indicated above can be selectively removed from the coupled amino acid-modified support utilizing for example 0.5 TFA in methylene chloride within a few minutes at room temperature while the anchoring p-alkoxybenzyl ester linkage is stable under these conditions. The infrared spectrum of Bpoc-Phe-$OCH_2$-$C_6H_4$-$OCH_2$-$C_6H_4$-Resin which had been treated with this reagent for ten hours was identical to that of the same resin treated with the same acid for ten minutes. During this time there is no detectable free phenylalanine liberated into the solution as indicated by amino acid analysis. The anchoring bond on the other hand is cleaved quantitatively utilizing 50% TFA in methylene chloride at room temperature. For example, the above loaded resin after reacting under the aforesaid conditions for 30 minutes is examined by I.R. and it is observed that the ester bond at 1675 cm.$^{-1}$ disappeared completely. Additionally, more than 85% of the phenylalanine orginally in the loaded resin is found to be liberated into the solution. Similar results are obtained with the anchoring p-oxybenzyloxycarbonyl hydrazide linkage.

In the event it is desired to obtain the liberated peptide fragment in protected form it is necessary that the terminal amino acid be protected with a group stable to the acid conditions employed in removing the peptide from the resin support material. Suitable protective groups for the terminal amino acid in this embodiment of the present invention include the carbobenzoxy (Z), p-nitrobenzyloxycarbonyl, p-chlorobenzyloxycarbonyl, p-bromobenzyloxy-carbonyl, diisopropyloxycarbonyl, p-toluenesulfonyl, formyl, phthaloyl, etc. groups.

The modified resins of this embodiment of the present invention are thus generally useful in the preparation of protected peptides or peptide hydrazides which in turn may be employed, preferably after purification, in the synthesis of more complex, biologically active polypeptides by fragment condensation methods known in the art. The present modified resins do not have limitations regarding the use of certain amino acids which have proved troublesome in other solid phase systems, e.g., cysteine, methionine, tryptophan, tyrosine and the like.

The present invention is further illustrated by reference to the examples which follow in which all temperatures are given in degrees centigrade.

EXAMPLE 1

Methyl p-benzyloxybenzoate resin (II)

Merrifield resin (chloromethylated copolystyrene-1% divinyl benzene; 200–400 mesh, 0.90 mmoles Cl/g.) (45 g., 0.90 mmole/g.) was suspended in 250 ml. of N,N-dimethylacetamide and 16 g. of methyl 4-hydroxy benzoate was added. The flask was flushed with argon gas for a few minutes and then 5.8 g. of sodium methoxide was added under argon. The mixture was tightly stoppered and stirred at $80°$ for 24 hours. The resin was collected on a coarse glass filter and washed successively with dimethylformamide, methylene chloride and methanol to give 49.5 g. of desired compound. The resin absorbed strongly at 1712 cm.$^{-1}$ and 1120 cm.$^{-1}$. Microanalysis showed that there was 2.69% (0.87 mmoles/g.) of —$OCH_3$ but no detectable chlorine.

EXAMPLE 2 p-Alkoxybenzyl alcohol resin (III)

Forty five grams of resin II was stirred in 600 ml. dry ether and 4.6 g. of $LiAlH_4$ was added slowly with caution. The stirring was continued for 6 hours at room temperature and then the resin was filtered and washed with methanol, methylene chloride, ethyl acetate and then methanol. The resin, slightly gray in color, was suspended in 2000 ml. of 1:1 dioxane-$N$ $H_2SO_4$ and stirred for 45 hours during which time the solvent was changed once at 15 hours. After washing with dioxane-water, dioxane and methanol 43 g. of snow white resin was obtained. The ester band at 1712 cm.$^{-1}$ disappeared completely while the band at 1220 cm.$^{-1}$ remained essentially unchanged. The product contained 0.34% (0.10 mmole/g.) of —OCH$_3$ according to microanalysis.

The same resin can also be prepared in the following manner. Thus, 5.1 g. of Merrifield resin (4.6 mmoles) was stirred with 0.744 g. of 4-hydroxybenzyl alcohol (6.0 mmoles) and 0.324 g. of sodium methoxide (6.0 mmoles) in 30 ml. of dimethylacetamide under argon at 80° for 24 hours. The reaction turned dark blue-green during this time. The resin was collected and washed as described above to give 5.2 g. of p-alkoxybenzyl alcohol resin IV. The I.R. spectrum of this resin is identical to that of p-alkoxybenzyl alcohol resin III. The material obtained contained 0.07% chlorine (0.02 mmole/g.) according to elemental analysis.

EXAMPLE 3 p-Alkoxybenzyloxycarbonylhydrazide resin (VI)

8 g. of alcohol resin (III) prepared above were suspended in 70 ml. of methylene chloride and chilled to 0°. Pyridine (5.5 ml.) was added followed by 7.8 ml. of phenylchloroformate, and the suspension stirred overnight at the same temperature. The suspension was poured on approximately 30 g. of crushed ice, and the resin collected and washed with dioxane-water, dimethylformamide, methylene chloride and methanol to give 8.1 g. of phenylcarbonate resin (V). This material absorbed strongly at 1750 cm.$^{-1}$ and contained 9.4% of oxygen calculated from C.H.N. analyses. It was then suspended in 70 ml. of dimethylformamide and treated with 6.6 ml. of anhydrous hydrazine while stirring at room temperature for 6 hours, the resin was collected and washed as usual to give 6.8 g. of the desired resin VI. The resin has an intensive absorption band at 1720 cm.$^{-1}$ and contained 2.45% (0.88 mmoles/g. hydrazide) of nitrogen according to microanalysis.

EXAMPLE 4

Bpoc-aminoacyl p-alkoxybenzyl alcohol resin (VIII)

Five grams of the alcohol resin (III, 4.4 mmoles) were washed several times with methylene chloride and then suspended in 40 ml. of methylene chloride with 0.51 ml. (6.3 mmoles) of pyridine. Bpoc-L-phenylalanine (6.2 mmoles) was added followed by 1.3 g. (6.3 mmoles) of dicyclohexylcarbodiimide (DCC). The mixture was stirred at room temperature for 150 minutes and then the esterified resin collected by suction filtration. After washing with methylene chloride, dimethylformamide and methanol, 5.83 g. of Bpoc-phenylalanyl resin was obtained. The esterified resin has a broad strong band centered at 1720 cm.$^{-1}$ in the I.R. spectrum. To eliminate the unreacted free hydroxy groups on the resin, the resin was suspended in 58 ml. of methylene chloride and reacted with 1.65 ml. pyridine and 1.95 ml. of benzoyl chloride at 0°. After stirring at the same temperature for 15 minutes, the resin was collected and washed as usual. The benzoylated Bpoc-phenylalanyl resin (VIII, 6.05 g.) has enhanced absorption at 1720 cm.$^{-1}$ and contained 0.41 mmol per gram of phenylalanine according to amino acid analysis. Nitrogen analysis indicated that the resin had 0.60% (0.425 mmoles/g.) of nitrogen. When alcohol resin IV prepared from Merrifield resin and 4-hydroxybenzylalcohol was treated in exactly the same manner as described above, the benzoylated Bpoc-phenylalanine resin thus obtained gave identical I.R. spectrum as VIII and was found to contain 0.406 mmoles/g. of phenylalanine according to amino acid analysis.

EXAMPLE 5

Acylation of free hydroxyl group on p-alkoxybenzyl alcohol resin

Since esterification of the hydroxyl group on the resin with Bpoc-amino acids did not proceed to completion, it was necessary to remove the unreacted free hydroxyl group so that it would not interfere with further peptide coupling reaction by DCC. In order to study the effectiveness of various acylating agents, the resin was treated with benzoyl chloride, acetic anhydride and acetyl imidazole. The rate of acylation was studied spectrophotometrically. The resin (0.3 g.) was suspended in 3 ml. of methylene chloride with 0.085 ml. pyridine added. At 0°, 0.1 ml. of benzoyl chloride was added and 0.1 ml. samples were withdrawn at various time intervals. They were washed thoroughly immediately with methylene chloride followed by methanol, and I.R. spectra were taken. The rate of increase in the ratio of ester band (1720 cm.$^{-1}$) to polystyrene band at 1600 cm.$^{-1}$ was taken as the rate of benzoylation. The reaction was found to proceed extremely rapidly to completion within a few minutes. It can be calculated that the half-life time was approximately 40 seconds. Acetylation with tenfold excess of acetic anhydride in the presence of an equivalent amount of triethyl amine proceeded much slower. The reaction was approximately 70% complete after 60 minutes at room temperature. Addition of catalytic amount (1/20 equivalent to acetic anhydride) of 4-dimethylaminopyridine to the above acetylation mixture did bring the reaction to completion after 60 min. according to the spectrometric assay similar to that described above (ratio of 1732 cm.$^{-1}$/1600 cm.$^{-1}$).

EXAMPLE 6

Racemization test for Bpoc-aminoacyl resin (a) Bpoc-phenylalanyl resin (VIII) (0.5 g.; 0.21 mmoles) was deprotected with 12 ml. of 0.5% trifluoroacetic acid (TFA) in methylene chloride, washed with methylene chloride, methanol, and neutralized with 12 ml. of 10% triethylamine (TEA) in methylene chloride. After washing with methylene chloride, the free phenylalanyl resin was reacted with Boc-L-glutamic acid γ-t-butyl-ester- and 0.16 g. of DCC for 120 min. to form Boc-L-Glu(Bu$^t$)-Phe-OCH$_2$-C$_6$H$_4$-OCH$_2$ - C$_6$H$_4$ - Resin. Fifty milligrams of this dipeptide resin was treated with 2 ml. of 50% TFA in methylene chloride at room temperature for 30 minutes, and the liberated dipeptide in the solution was separated from resin particles by filtration. The filtrate was evaporated to dryness and made up to 10 ml. with 0.01 N HCl for chromatographic analysis on an amino acid analyzer. The sample chromatographed identically with L-Glu-L-Phe with trace amount (less than 0.1%) of L-Glu-D-Phe detected. As a comparison, phenylalanyl t-alkyl alcohol resin prepared from Phth-Phe-O-C(CH$_3$)$_2$-CH$_2$-CH$_2$-C$_6$H$_4$-Resin by hydrazinolytic cleavage of the phthaloyl group was reacted with Boc-L-Glu(Bu$^t$) and treated as described above. The L-Glu-Phe sample obtained from this peptide t-alkyl alcohol resin was found to contain 56% of L-L and 44% of L-D diastereoisomers. Thus, it can be concluded that the esterification of Bpoc-amino acid to p-alkoxybenzyl alcohol resin (III) via DCC does not cause significant racemization, whereas esterification of t-alkylalcohol resin with phthaloylamino acid by p-toluenesulfonyl chloride does give rise to extensive racemization.

(b) In another experiment, Bpoc-L-Leu-OCH$_2$-C$_6$H$_4$-OCH$_2$-C$_6$H$_4$-Resin prepared similarily was first treated with 50% TFA in methylene chloride at room temperature for 30 min. to release the amino acid from the resin. The resin was removed by filtration and the filtrate evaporated to dryness. The residue was taken up with pH 10.2 buffer, reacted with L-leucine N-carboxyanhydride and then chromatographed as described by Manning and Moore, *J. Biol. Chem.*, 89, 5994 (1967). Virtually no (<0.1%) L-Leu-D-Leu was found in the sample. The dipeptide sample chromatographed identically with L-Leu-L-Leu.

EXAMPLE 7

Z-Leu-Leu-Val-Phe (XII)

Bpoc-Phe-OCH$_2$-C$_6$H$_4$-OCH$_2$-C$_6$H$_4$ - Resin (VIII) (3.2 g., 1.3 mmoles) was placed in a peptide reaction vessel and treated as follows with 65 ml. portions of solvents: (1) wash three times with methylene chloride (CH$_2$CH$_2$), (2) wash once with 0.5% TFA in CH$_2$Cl$_2$, (3) shake 10 min. with 0.5% TFA in CH$_2$Cl$_2$, (4) wash three times with CH$_2$Cl$_2$, (5) wash once with 10% TEA in CH$_2$Cl$_2$, (6) wash three times with CH$_2$Cl$_2$, (7) wash three times with methanol (MeOH) (8) wash three times with CH$_2$Cl$_2$, (9) shake 10 min. with 10% TEA in CH$_2$Cl$_2$, (10) wash three times with CH$_2$Cl$_2$, (11) soak 10 min. with 1.50 g. (4.2 mmoles) of Bpoc-L-Val in 40 ml. of CH$_2$Cl$_2$, then add 0.87 g. (4.2 mmoles) of DCC in 20 ml. of CH$_2$Cl$_2$, and shake 120 min., (12) wash three times with CH$_2$Cl$_2$, (13) wash three times with DMF, and (14) wash three times with MeOH. The cycle was repeated with 1.55 g. (4.2 mmoles) of Bpoc-L-Leu in step 11, and again with 1.1 g. (4.2 mmoles) of Z-L-Leu. In each cycle 3.2 fold excess of amino acid derivative was used. The protected peptide resin (XI) weighed 3.8 g. after drying. According to amino acid analysis, this material contained 0.38 mmoles of peptide per gram of resin and had an amino acid composition of Val$_{0.98}$Leu$_{2.00}$Phe$_{1.21}$. The protected peptide was liberated from the resin by stirring 3.47 g. of XI with 70 ml. of 50% TFA in CH$_2$Cl$_2$ at room temperature for 30 min. The resin was removed by filtration and washed with small volume of CH$_2$Cl$_2$ a few times. After evaporation of the solvent under reduced pressure at 30°, an oily residue remained which on treatment with petroleum ether began to solidify immediately. It was dissolved in 200 ml. of ethylacetate-ether mixture and filtered quickly to remove small insoluble material. The filtrate was left at 4° overnight during which time crystalline precipitate formed. The solid was collected by suction and washed with petroleum ether to give 0.54 g. (68.3%) of desired compound XII, M.P. 214–219°. It had an amino acid composition of Val$_{0.95}$Leu$_{1.94}$-Phe$_{1.08}$. By tlc it was found to be homogeneous in three systems.

*Analysis.*—Calcd. for C$_{34}$H$_{48}$N$_4$O$_7$ (624.79): C, 65.36; H, 7.74; N, 8.97. Found: C, 65.32; H, 7.59; N, 8.77.

EXAMPLE 8

Z-Leu-Leu-Val-Phe-OCH$_3$ (XIII)

Compound XII (0.42 g.) was dissolved in 300 ml. of 0.2 N methanolic HCl, kept standing at room temperature for 3 hours and then overnight at 4°. A small quantity of insoluble material was filtered off and the solvent was removed by evaporation at 30° under reduced pressure. The residue was taken up with 80 ml. of ethyl acetate and treated with approximately 2 volumes of petroleum ether. Upon standing at 4° overnight it gave 0.35 g. (82%) of crystalline ester, M.P. 204–206°.

*Analysis.*—Calcd. for C$_{35}$H$_{50}$N$_4$O$_7$ (638.8): C, 65.80; H, 7.89; N, 8.77. Found: C, 65.22; H, 7.80; N, 8.78.

EXAMPLE 9

Z-Phe-Val-Ala-Leu-HNNH$_2$ (XVI)

The hydrazide resin VI (1.1 g., 0.96 mmoles) was reacted for 90 min. with 0.67 g. of Bpoc-L-Leu (1.8 mmoles) in 8 ml. of methylene chloride with addition of 0.37 g. (1.8 mmoles) of DCC. The resin was collected by filtration and washed with CH$_2$Cl$_2$, DMF and methanol to give 1.2 g. of Bpoc - Leu-HNNH-COOCH$_2$-C$_6$H$_4$-OCH$_2$-C$_6$H$_4$-Resin (XIV). The resin was benzoylated with benzoyl chloride and pyridine as described in Example 5 and then used for further synthesis. Amino acid analysis indicated that the resin contained 0.86 mmoles/g. of leucine.

To see whether the sample was contaminated with Bpoc-Leu-OCH$_2$-C$_6$H$_4$-OCH$_2$-C$_6$H$_4$-Resin which might result from incomplete hydrazinolysis or hydrolysis of resin V, 50 mg. of XIV was treated with 50% TFA in methylene chloride for 30 min. at room temperature and the liberated amino acid hydrazide was examined on tlc. Only leucine hydrazide was found. There was no free leucine detectable in the sample.

The synthesis was carried out with 0.60 g. (0.52 mmoles) of Bpoc-Leu-HNNH-Resin XIV in a peptide reaction flask with 12 ml. of solvents according to the procedure described above using 0.5% TFA as deprotecting agent. Bpoc-L-Ala (0.52 g.; 1.6 mmoles), Bpoc-L-Val (0.57 g.; 0.6 mmoles) and Z-L-Phe (0.47 g.; 1.6 mmoles) were sequentially coupled to the resin in each cycle (see Scheme III) to give 0.63 g. of Z-Phe-Val-Ala-Leu-HNNH-CO-OCH$_2$-C$_6$H$_4$-OCH$_2$-C$_6$H$_4$-Resin (XV). The resin contained 0.49 mmoles/g. of peptide according to amino acid analysis and had an amino acid composition of Ala$_{0.93}$-Val$_{1.00}$Leu$_{0.93}$Phe$_{1.06}$. Part of the resin (0.50 g.) was treated with 10 ml. of 50% TFA in methylene chloride for 30 min. at room temperature. The liberated protected peptide hydrazide was worked up as usual to give 0.105 g. (42%) of crystalline product, M.P. 252–254.

*Analysis.*—Calcd. for C$_{31}$H$_{44}$N$_6$O$_6$ (596.71): C, 62.39; H, 7.43; N, 14.09. Found: C, 62.29; H, 7.33; N, 13.73.

EXAMPLE 10

Asp-Arg-Val-Tyr-Val-His-Pro-Phe (XVIII)

The Val$^5$-angiotensin II sequence was synthesized from VIII as outlined in Scheme IV. Bpoc-L-Phe-OCH$_2$-C$_6$H$_4$-OCH$_2$-C$_6$H$_4$-Resin (VIII) (1.0 g., 0.41 mmoles) was placed in the peptide reaction vessel and treated with 18 ml. of solvents as described above. Fourfold excess (1.6 mmoles) each of Bpoc-L-Pro (0.565 g.), Bpoc-L-His(Tos) (1.08 g.), Bpoc-L-Val (0.568 g.), Bpoc-L-Tyr(Bzl) (0.815 g.), Bpoc-L-Val (0.568 g.), Bpoc-L-Arg(NO$_2$) (0.732 g.) and Z-Asp(Bzl) (0.571 g.) were successively incorporated into the growing peptide chain by the procedure outlined above to give 1.36 g. of protected octapeptide resin. Treatment of 1.32 g. of this material with 26 ml. 50% TFA in methylene chloride at room temperature for 30 min. and worked up as usual gave 0.42 g. of protected peptide free acid XVII as amorphous white solid. It had an amino acid composition of

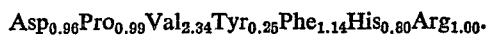

*Analysis.*—Calcd. for C$_{78}$H$_{92}$N$_{14}$O$_{18}$S (15445.77); C, 60.61; H, 6.00; N, 12.69. Found: C, 59.25; H, 6.09; N, 12.74.

Without further purification at this stage, part of the material (0.35 g.) was dissolved in 2 ml. of TFA with 0.35 ml. of anisol. The mixture was then treated with 8 ml. of anhydrous HF at 0° for 60 min. to remove all the protecting groups. After evaporating off the acids, the residue was dissolved in 80 ml. of water and extracted several times with ether. The aqueous solution was lyophilized to give 0.17 g. of crude angiotensin II. The material was purified by counter current distribution in n-butanol, acetic acid, water (4:1:5) system for 200 transfer (K=0.27) and then further chromatographed on a Sephadex G–10 (2.5 x 85 cm.) column with 0.2 M acetic acid as eluent. The material in the major peak was collected and lyophilized to give 56 mg. of pure Val$^5$-angiotensin II. It was shown to be homogeneous by tlc in three solvent systems and also in electrophoresis at pH 1.9 and pH 5.6. It gave an amino acid analysis of

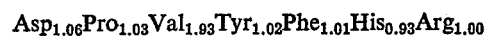

after acid hydrolysis.

*Analysis.*—Calcd. for C$_{51}$H$_{83}$N$_{13}$O$_{19}$ (1182.28): C, 51.81; H, 7.08; N, 15.40. Found: C, 51.84; H, 7.06; N, 15.47.

EXAMPLE 11

One hundred grams of chloromethylated pellicular resin (ClCH$_2$-C$_6$H$_4$-Resin-Glass Bead) (Northgate Laboratories, Inc., Hamden, Conn.) C=0.46%, H=0.047%, Cl=0.17%) (4.78 mmoles) was suspended in 100 ml. of dimethylacetamide and reacted with 1.1 g. of 4-hydroxy benzyl alcohol (8.8 mmoles) in the presence of 0.49 g. of sodium methoxide (8.8 mmoles) at 80° for 24 hours with occasional shaking. The resin-glass beads were then collected and washed as usual to give 99 g. of material which gave the following analysis: C, 0.699; H, 0.056; Cl, 0.009. From the chlorine content, it can be calculated that 94.7% of the functional group has been displaced by p-oxybenzyl alcohol group and the compound has the structure $HOCH_2$-$C_6H_4$-$OCH_2$-$C_6H_4$-Resin Glass Bead (Scheme V, formula XXV).

EXAMPLE 12

The p-alkoxybenzyl alcohol pellicular resin (XXV), (98 g., 4.5 mmoles) was suspended in 55 ml. of dioxane and reacted with 2.2 g. of Bpoc-glycine p-nitrophenyl ester (5.05 mmoles) in the presence of 3.4 g. (50 mmoles) of imidazole for 24 hours. The esterified resin was collected and washed as usual and then benzoylated as described previously herein to give 96.3 g. of Bpoc-Gly-$OCH_2$-$C_6H_4$-$OCH_2$-$C_6H_4$-Resin-Glass Bead (XXVI). According to amino analysis this resin contained 0.0035 mmoles/g. of glycine.

EXAMPLE 13

The alcohol resin (III) (6.1 g., 5.4 mmoles) was washed with dioxane and suspended in 50 ml. of the same solvent. Bpoc-glycine p-nitrophenyl ester (3.3 g., 7.5 mmole) was added followed by 5.1 g. (75 mmoles) of imidazole. The suspension was stirred gently at room temperature for 18 hours during which time small samples were taken and their I.R. spectra examined. The band at 1720 cm.$^{-1}$ increased to reach a plateau at about 16 hours. The esterification resin was collected and washed as usual to give 6.8 g. of Bpoc-Gly-$OCH_2$-$C_6H_4$-$OCH_2$-$C_6H_4$-Resin. It was benzoylated as described previously herein in order to eliminate the unreacted free hydroxy groups on the resin. After washing and drying, 7.0 g. of the desired product Bpoc-Gly-$OCH_2$-$C_6H_4$-$OCH_2$-$C_6H_4$-Resin (XIX) was obtained. The band at 1720 cm.$^{-1}$ in the I.R. spectrum had increased slightly and the resin was shown to contain 0.36 mmole/g. of glycine according to amino acid analysis.

EXAMPLE 14

Leu-Leu-Val-Phe-$OCH_3$ (XXVIII)

Compound XIII (Z-Leu-Leu-Val-Phe-$OCH_3$) (0.67 g.) was dissolved in 100 ml. 1:1 mixture of THF and MeOH to which 5 ml. of acetic acid was added. The mixture was hydrogenated in a Parr apparatus at 48 p.s.i. for 20 hours in the presence of 0.4 g. of 5% Pd/$BaSO_4$ as catalyst. Removal of the catalyst by filtration followed by evaporation of the solvents gave a white amorphous solid (0.48 g.). Recrystallization from methanol with ether gave 0.19 g. of the known product which is reported to inhibit renin activity. The product melted at 149–159° (dec.) and was found to be homogeneous on tlc in several solvent systems.

*Analysis.*—Calcd. for $C_{27}H_{44}N_4O_5$ (504.68): C, 64.20; H, 8.77; N, 11.10; $OCH_3$, 6.15. Found: C, 63.95; H, 8.72; N, 10.96; $OCH_3$, 6.09.

EXAMPLE 15

Z-Lys(Z)-Phe-Phe-Gly-OH (XXI)

(a) The protected glycyl resin XIX (Bpoc-Gly-$OCH_2$-$C_6H_4$-$OCH_2$-$C_6H_4$-Resin; 7.0 g., 2.5 mmoles) was placed in the peptide reaction vessel and treated with 150 ml. portions of solvents (or reagents) as described above. The peptide chain was assembled with 2.4 fold excess (6 mmoles) each of Bpoc-L-Phe (2.42 g.), Bpoc-L-Phe (2.42 g.) and $N^\alpha$,$N^\epsilon$-dicarbobenzoxy-L-Lys (2.43 g.) sequentially by the procedure outlined above to give 7.5 g. of Z-Lys(Z)-Phe-Phe-Gly-$OCH_2$-$C_6H_4$-$OCH_2$-$C_6H_4$-Resin (XX) (see Scheme VI). To release the protected peptide from the resin, the peptide resin was stirred in 130 ml. of 1:1 mixture of TFA and $CH_2Cl_2$ at room temperature for 30 min. After removal of the resin particles by filtration, the filtrate was concentrated at 30° to leave an oily syrup which on treatment with 50 ml. of ethyl acetate solidified immediately. The product was then collected after overnight standing at 4° and dried to give 1.55 g. of white solid melting at 210–215°. Recrystallization from THF and water gave 1.02 g. (53.2%) of pure product (XXI), M.P. 220–222°. $[\alpha]_D^{25}$=−25.55° (c.=1, DMF).

*Analysis.*—Calcd. for $C_{42}H_{47}N_5O_9$ (765.86): C, 65.86; H, 6.19; N, 9.14. Found: C, 65.81; H, 6.19; N, 9.14.

(b) The same compound was also prepared by the use of Bpoc-Gly-$OCH_2$-$C_6H_4$-$OCH_2$-$C_6H_4$-Resin-Glass Bead (XXVI). Ninety-five grams of XXVI (0.33 mmoles) was packed in a 4.5×4 cm. column and the synthesis carried out with 35 ml. portions of solvents (or reagents) as described above with Bpoc-L-Phe (1.13 g., 2.8 mmoles), Bpoc-L-Phe (1.13 g., 2.8 mmoles), $N^\alpha$,$N^\epsilon$-dicarbobenzoxy-L-Lys (1.14 g., 2.8 mmoles) sequentially attached to the growing peptide chain in the column to form Z-Lys(Z)-Phe-Phe-Gly-$OCH_2$-$C_6H_4$ - Resin - Glass Bead (XXVII). The protected peptide was then released from the column by a 30 min. treatment with 80 ml. of 50% TFA in $CH_2Cl_2$ moving very slowly through the column. The effluent was collected and combined with the $CH_2Cl_2$ washings of the column (100 ml.) and evaporated to give an oily residue. Treatment with 50 ml. of ethyl acetate followed by standing at 4° overnight gave 0.254 g. of white solid melting at 216–219°. The solid was collected and then was dissolved in 25 ml. of THF, filtered to remove some resinous material and then precipitated with water. Reprecipitation of the product from acetone and water gave 0.11 g. of semicrystalline material. Tlc, ir, uv and nmr analyses indicated that the material was identical with the material obtained above (XXI), M.P. 217–219°. $[\alpha]_D^{25}$=−23.23° (c.=1, DMF).

*Analysis.*—Found: C, 65.48; H, 6.47; N, 8.61.

EXAMPLE 16

Z-Lys(Z)-Phe-Phe-Gly-Leu-Met-$NH_2$ (XXIV)

Bpoc-L-Leu-Met-$OCH_3$ (0.515 g., 1.0 mmole) was treated with 0.05 M HCl in ethyl acetate-$CH_2Cl_2$ mixture for 20 minutes. The solvents were removed by evaporation at 30° under reduced pressure to give a clear oil. It was dissolved in a mixture of 15 ml. each of $CH_2Cl_2$ and DMF and chilled in an ice bath. Z-Lys(Z)-Phe-Phe-Gly-OH (XXI) (0.766 g., 1.0 mmole) was then added followed by 0.3 ml. of N-methyl morpholine (see Scheme VI). N,N'-dicyclohexylcarbodiimide (0.23 g., 1.1 mmole) was added at 0° and the reaction mixture stirred at 0° for 15 min. and then overnight at room temperature. The insoluble material was filtered off and the filtrate evaporated to leave a solid mass. The product was taken up in $CH_2Cl_2$-DMF mixture and precipitated with ether to give 1.15 g. of material melting at 17–178°. Recrystallization from THF and ether gave 0.85 g. of Z-Lys(Z)-Phe-Phe-Gly-Leu-Met-$OCH_3$ (XXIII), M.P. 180–184°.

*Analysis.*—Calcd. for $C_{54}H_{69}N_7O_{11}S$ (1024.268): C, 63.32; H, 6.79; N, 9.57; S, 3.13. Found: C, 63.87; H, 6.74; N, 9.54; S, 2.60.

Part of compound XXIII (0.75 g., 0.73 mmoles) was suspended in 200 ml. of methanol and chilled in an ice bath. Dry ammonia was bubbled through until saturated during which time the solution became clear. The flask was tightly stoppered and left standing overnight. The crystalline product formed was collected and washed with ether to give 0.58 g. of the desired compound (XXIV), M.P. 238–242° $[\alpha]_D^{25}$=39.28° (c.=1, DMF).

*Analysis.*—Calcd. for $C_{53}H_{68}N_8O_{10}S$ (1009.26): C, 63.08; H, 6.70; N, 11.10; S, 3.18. Found: C, 62.79; H, 6.70; N, 11.25; S, 2.90.

The starting material was prepared as follows:

L-Met-$OCH_3$ HCl (4.54 g., 22.7 mmoles) was suspended in 100 ml. of $CH_2Cl_2$ chilled in an ice bath. Triethylamine (3.2 ml., 23 mmoles) was added followed by 8.4 g. of Bpoc-L-Leu (22.7 mmoles) and 4.7 g. of DCC (22.7 mmoles). The mixture was stirred briefly at 0° and then for two hours at room temperature. The insoluble dicyclohexyl urea was then filtered off and the filtrate evaporated to a clear oil. The residue was taken up in 50 ml. of CH₂Cl₂ and treated with two volumes of petroleum ether. The solid formed was removed by suction filtration and the filtrate treated with more petroleum ether. Long needles of the product formed slowly during storage at 4° overnight. It was collected and washed with petroleum ether to give 6.5 g. of desired material; (Bpoc-Leu-Met-OCH₃), M.P. 80–82° [α]=−38.09° (c.=1, MeOH).

Analysis.—Calcd. for C₂₈H₃₈N₂O₅S (514.69): C, 65.34; H, 7.44; N, 5.44. Found: C, 65.73; H, 7.83; N, 5.38.

Scheme I.

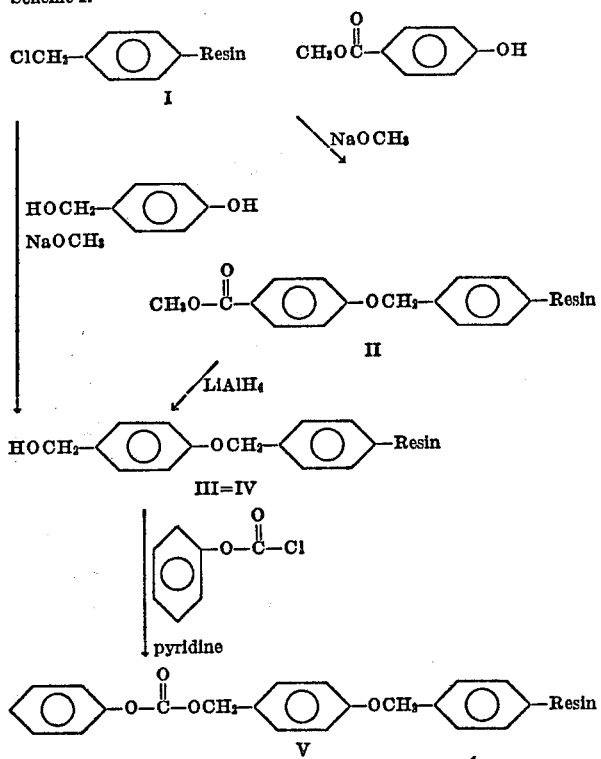

Scheme II.

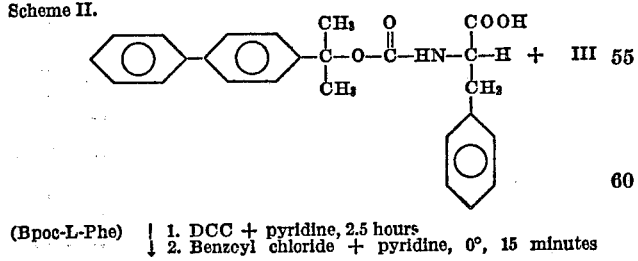

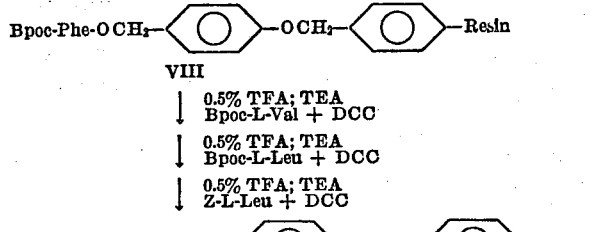

Scheme III.

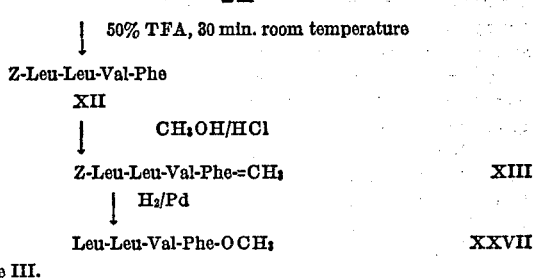

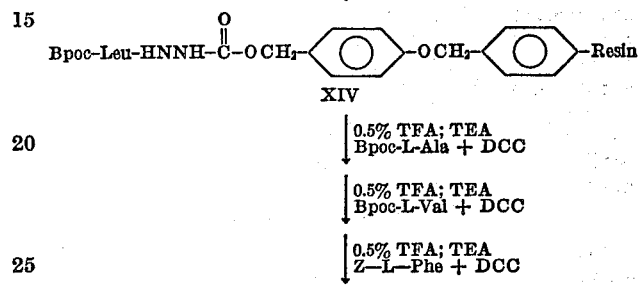

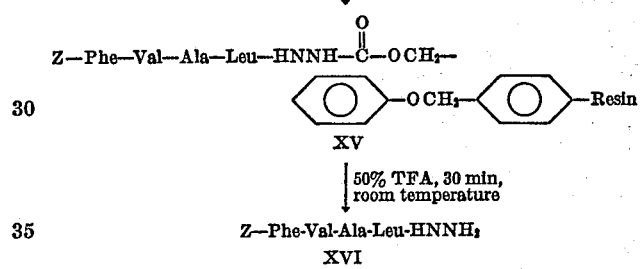

Scheme IV.

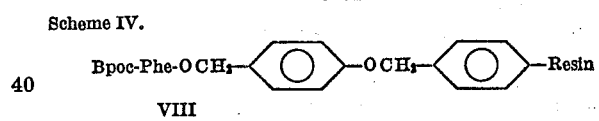
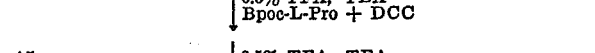
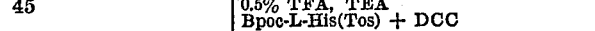
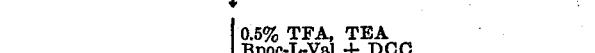
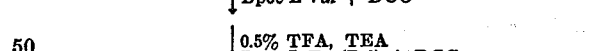
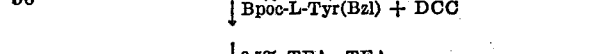
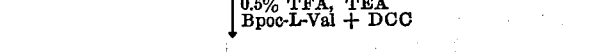
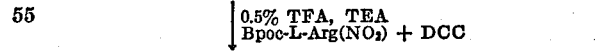
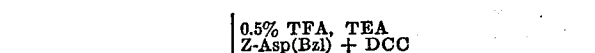
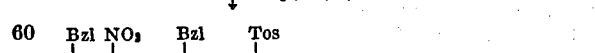
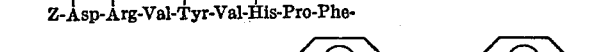
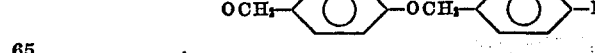
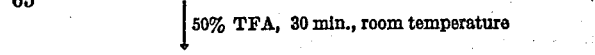
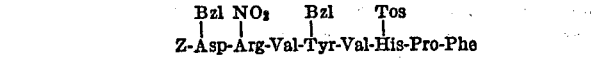
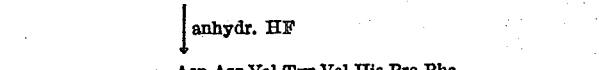
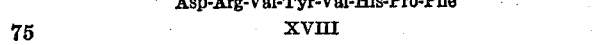

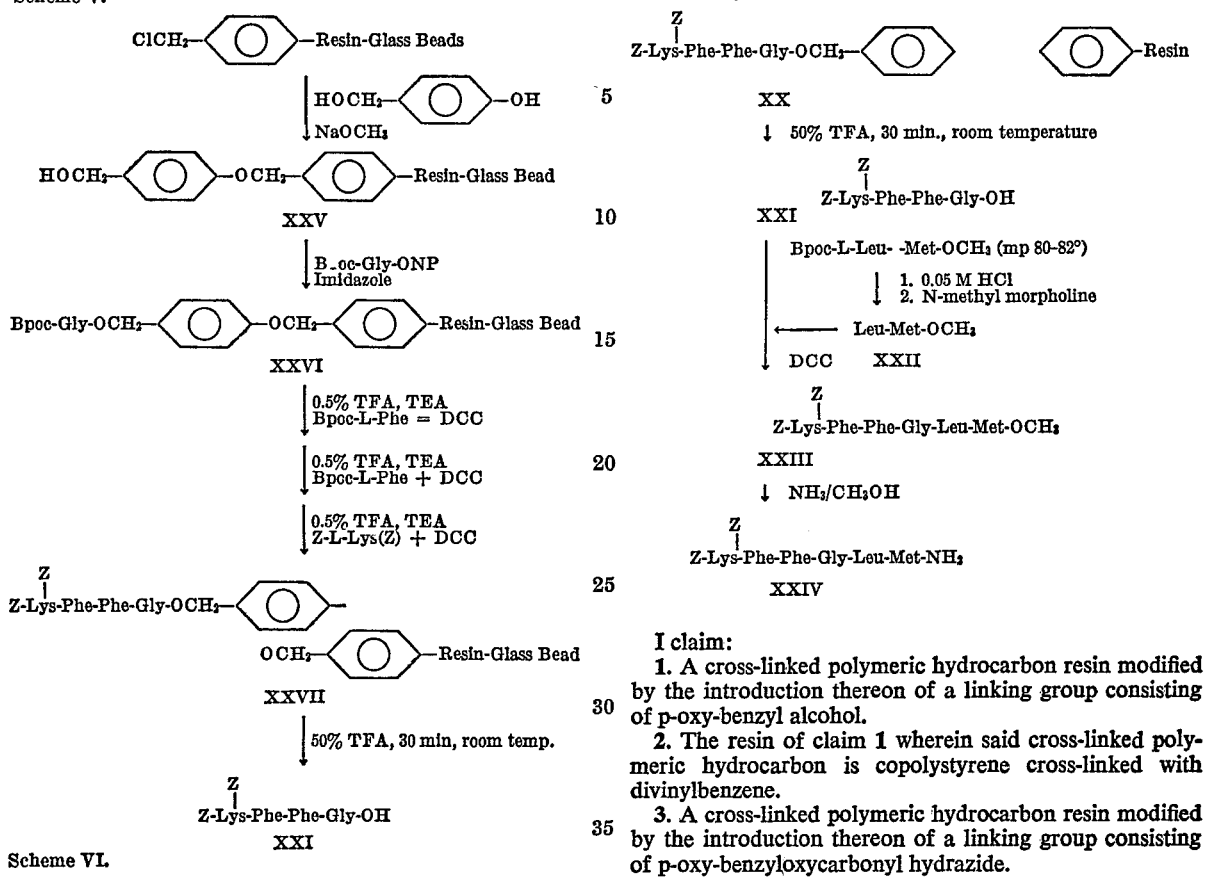
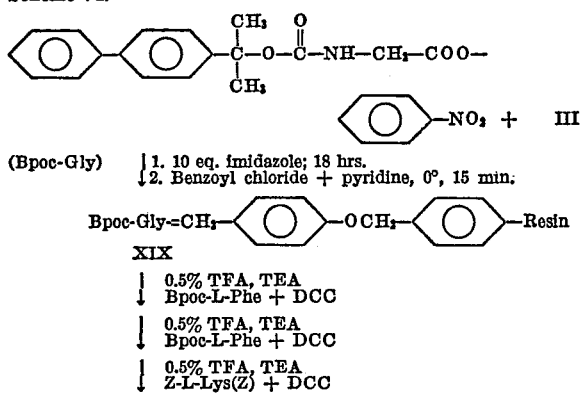

I claim:
1. A cross-linked polymeric hydrocarbon resin modified by the introduction thereon of a linking group consisting of p-oxy-benzyl alcohol.
2. The resin of claim 1 wherein said cross-linked polymeric hydrocarbon is copolystyrene cross-linked with divinylbenzene.
3. A cross-linked polymeric hydrocarbon resin modified by the introduction thereon of a linking group consisting of p-oxy-benzyloxycarbonyl hydrazide.
4. The resin of claim 3 wherein said cross-linked polymeric hydrocarbon is copolystyrene cross-linked with divinylbenzene.

References Cited
UNITED STATES PATENTS

| | | | |
|---|---|---|---|
| 3,518,240 | 6/1970 | Tilak | 260—188.2 |
| 3,531,258 | 9/1970 | Merrifield | 23—252 |
| 3,645,996 | 2/1972 | Southard | 260—88.2 C |

JOSEPH L. SCHOFER, Primary Examiner
C. A. HENDERSON, JR., Assistant Examiner

U.S. Cl. X.R.
260—112.5